G. P. CRUMBAUGH.
COATING APPARATUS.
APPLICATION FILED DEC. 23, 1915.
1,218,241.
Patented Mar. 6, 1917.
5 SHEETS—SHEET 1.
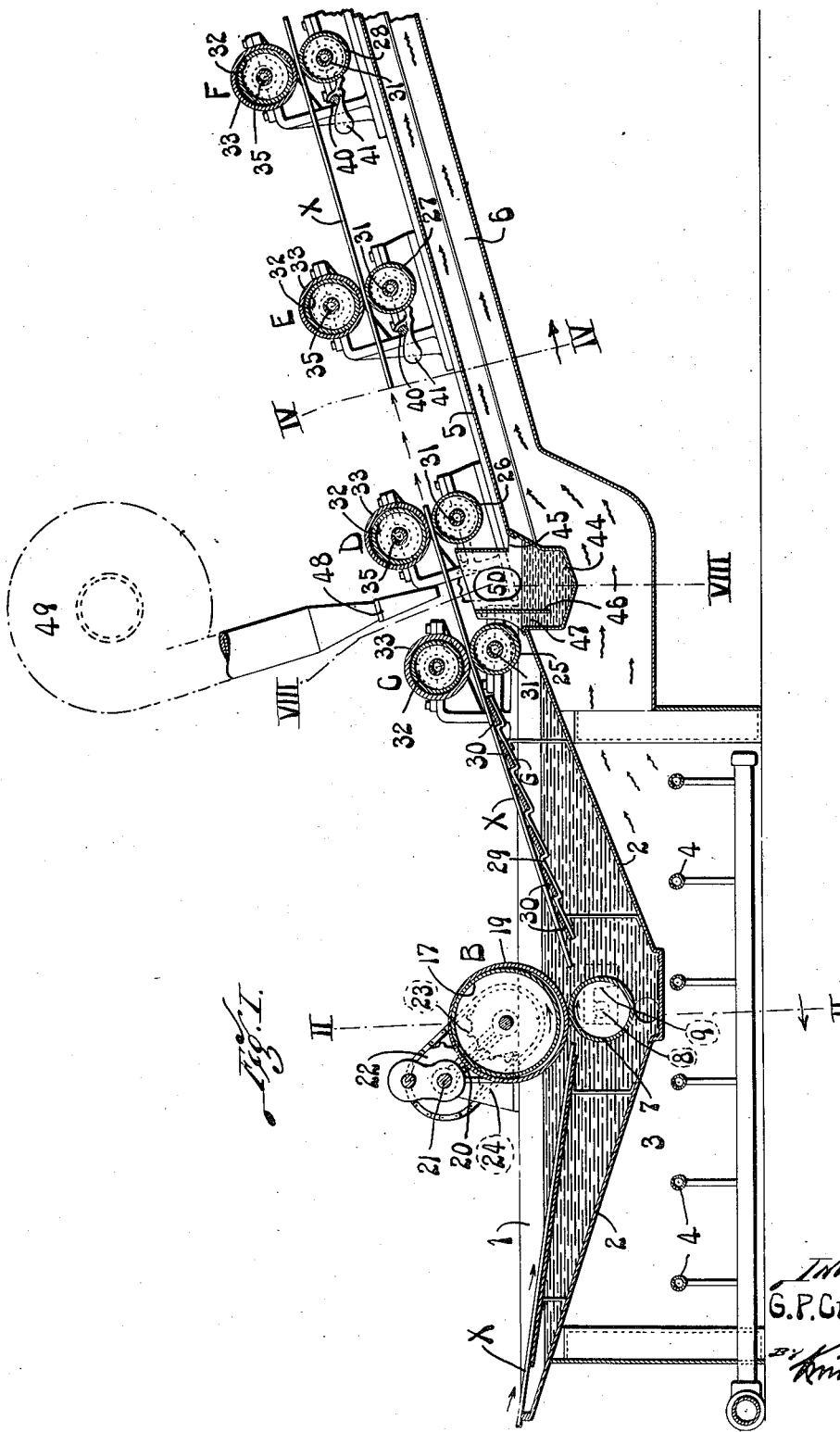

G. P. CRUMBAUGH.
COATING APPARATUS.
APPLICATION FILED DEC. 23, 1915.
1,218,241.
Patented Mar. 6, 1917.
5 SHEETS—SHEET 2.
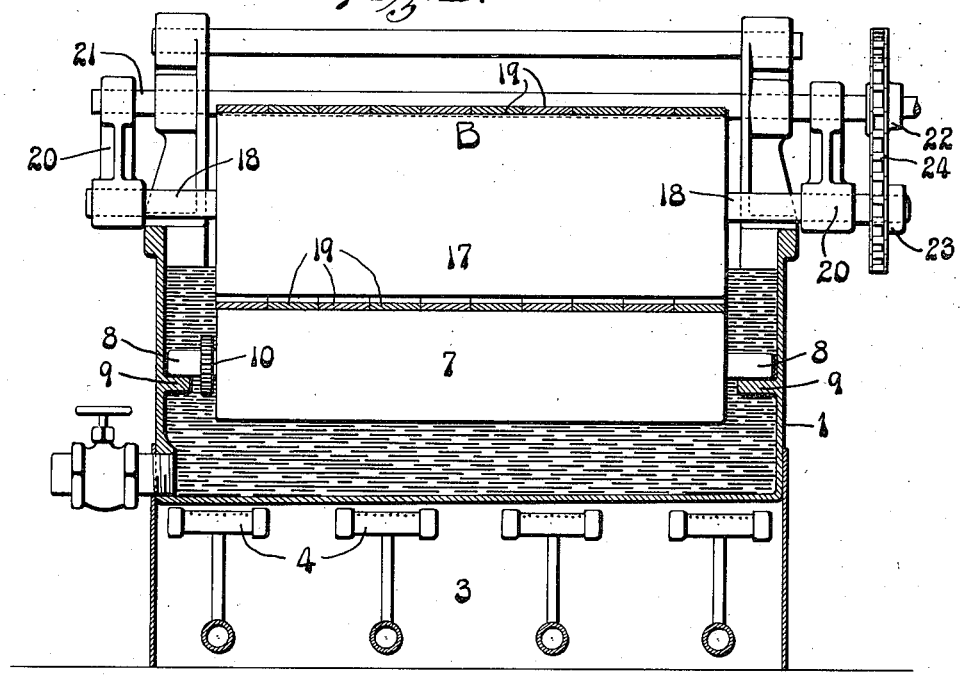
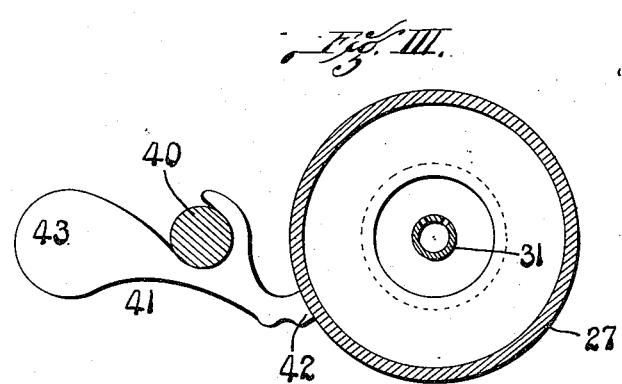
INVENTOR
G. P. Crumbaugh G. P. CRUMBAUGH.
COATING APPARATUS.
APPLICATION FILED DEC. 23, 1915.
1,218,241.
Patented Mar. 6, 1917.
5 SHEETS—SHEET 3.
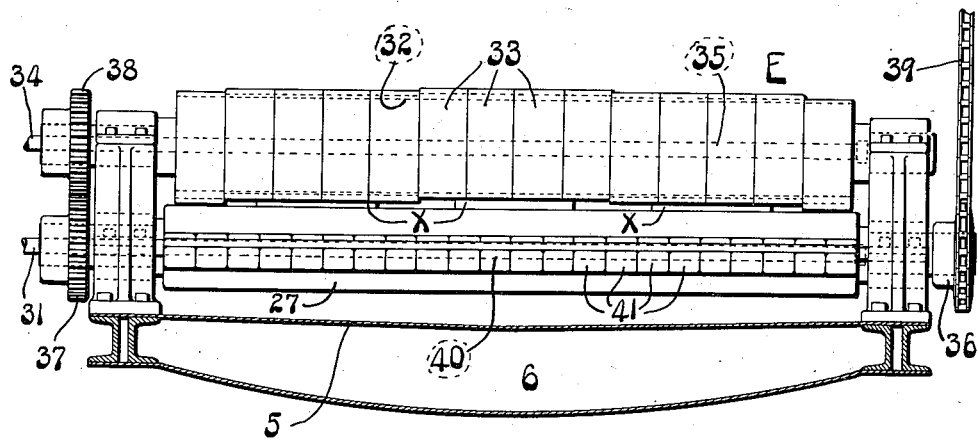
Fig. IV.
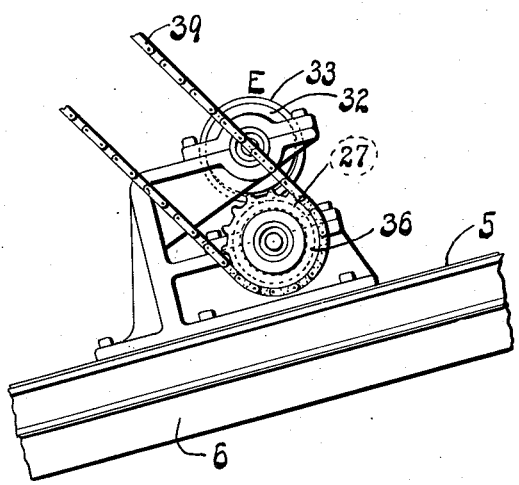
Fig. V.
Inventor:—
G. P. Crumbaugh
By Knight & Cook, attys.

G. P. CRUMBAUGH.
COATING APPARATUS.
APPLICATION FILED DEC. 23, 1915.
1,218,241.
Patented Mar. 6, 1917.
5 SHEETS—SHEET 4.
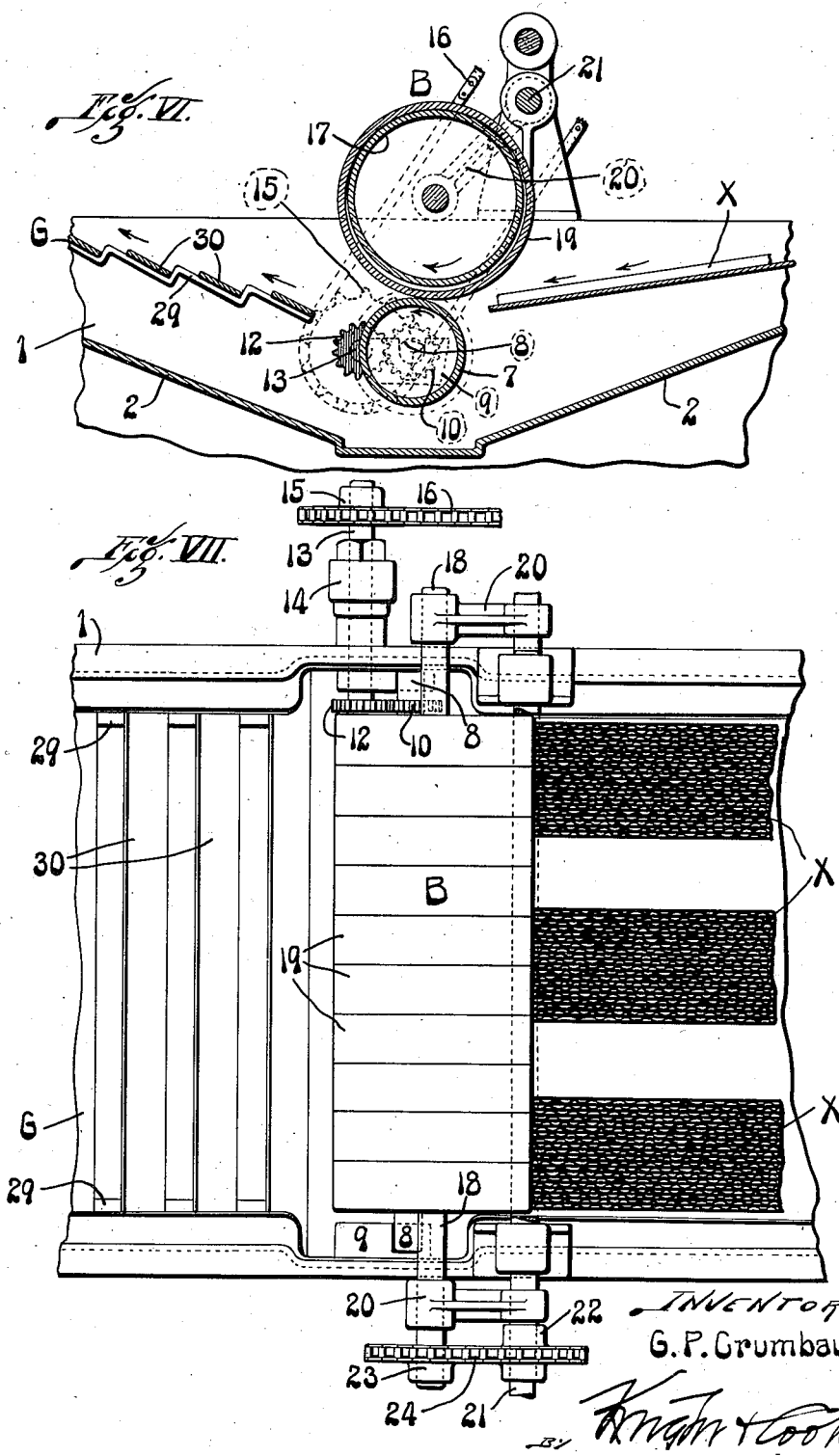

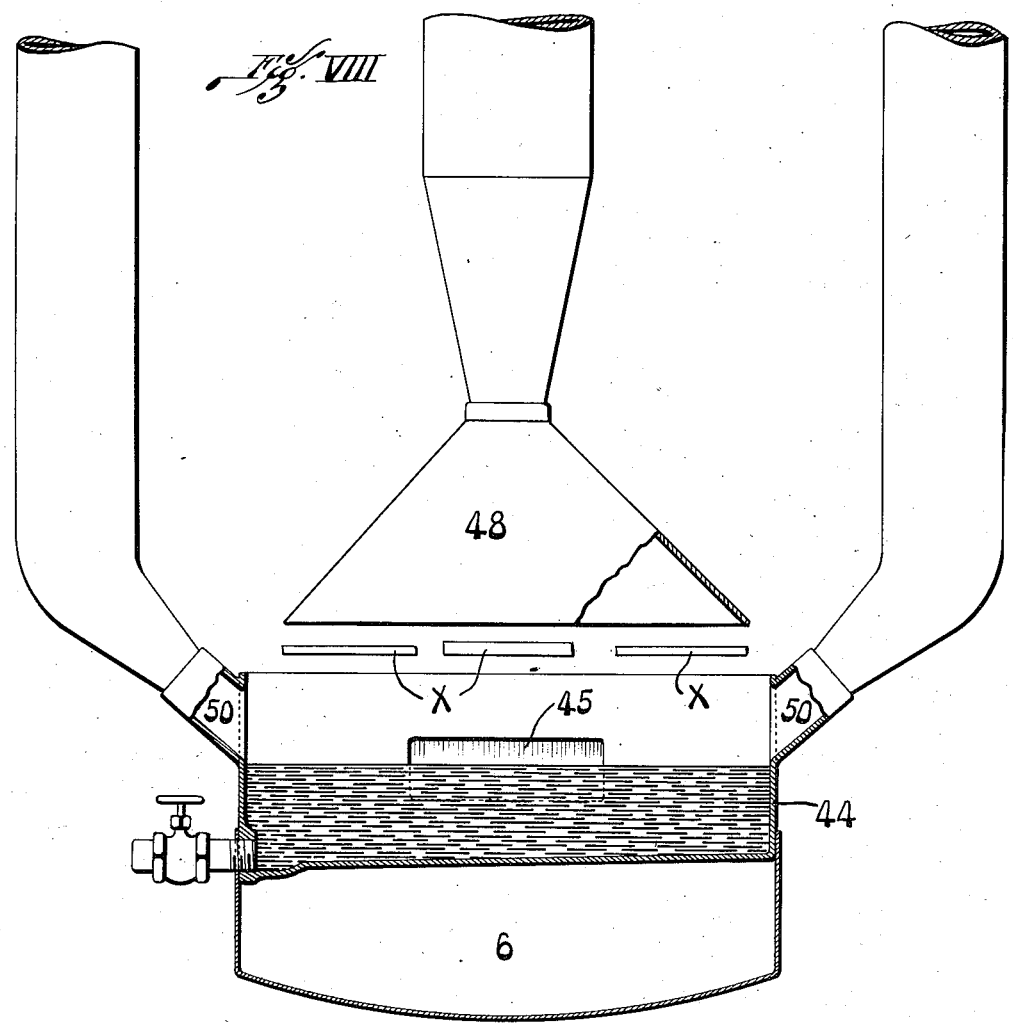

UNITED STATES PATENT OFFICE.

GEORGE PARKER CRUMBAUGH, OF ST. LOUIS, MISSOURI, ASSIGNOR OF ONE-HALF TO EDWIN W. GROVE, OF ST. LOUIS, MISSOURI.

COATING APPARATUS.

1,218,241.  Specification of Letters Patent.  Patented Mar. 6, 1917.

Application filed December 23, 1915. Serial No. 68,389.

*To all whom it may concern:*

Be it known that I, GEORGE P. CRUMBAUGH, a citizen of the United States of America, a resident of the city of St. Louis, State of Missouri, have invented certain new and useful Improvements in Coating Apparatus, of which the following is a full, clear, and exact description, reference being had to the accompanying drawings, forming a part of this specification.

My invention relates to an apparatus particularly adapted for use in coating reticulated lath units with asphaltum, or the like, it being understood, however, that the new structure may be used in coating various different kinds of material, and, if desired, the articles delivered to the apparatus may also be saturated with the substance which I term "coating" material.

One of the principal objects of the invention is to produce a practicable means for feeding units, such for example as cellular laths, through a body of coating material, thereafter feeding the coated units away from the receptacle containing the coating material, and returning the excess material from the units to said receptacle.

The preferred form of the invention includes a chute leading to the receptacle containing the coating material, and means for feeding the coated articles from said receptacle, the chute being located immediately below the path of the coated articles, so that the excess material passing from said articles will drop onto said chute and return to the receptacle. Some of the excess material is removed by dropping from the coated articles directly to the chute, and some of this material is removed by adhering to feed rolls which lie immediately above the chute. The preferred structure also includes scraping devices fitted to the feed rolls in such a manner that the material scraped therefrom will drop onto the chute. The main receptacle is preferably heated to place the coating material in a plastic or liquid condition, and the return chute is also heated so that the material delivered thereto will flow downwardly by gravity and return to the main receptacle.

The means for feeding the units through the receptacle containing the coating material, preferably includes a feeding device for pushing the units from said receptacle, a second feeding device adapted to receive the units passing from the receptacle, and an inclined guide for directing units in an upward direction from one of said feeding devices to the other. This inclined guide is so constructed that the units will pass freely in an upward direction, while excess material carried by said units will flow freely in a downward direction.

Another object of the invention is to provide an improved feeding device including a pair of feed rolls one of which is adapted to yield so as to compensate for variations in the dimensions of the coated articles.

A further object of the invention is to provide means for forcing fluid through reticulated articles after they have passed from the coating material, thereby forcing excess material from the openings in said articles. A discharge nozzle is preferably located above the path of the reticulated articles, and the fluid, preferably air, is discharged through the articles to force excess material into a trap which lies below the path of the articles. The material overflowing from the trap returns to the main receptacle, and the air is discharged from the trap at a point above the surface of the material contained therein.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a longitudinal section of an apparatus embodying the features of my invention.

Fig. II is an enlarged vertical section taken approximately on the line II—II, Fig. I.

Fig. III is an enlarged detail view illustrating one of the feed rolls and the scraping device associated therewith.

Fig. IV is an enlarged transverse section taken approximately on the line IV—IV, Fig. I.

Fig. V is a side elevation of the structure shown in Fig. IV.

Fig. VI is an enlarged fragmentary section showing the middle portion of the main receptacle and the feeding device located therein.

Fig. VII is a top or plan view of the parts shown in Fig. VI.

Fig. VIII is an enlarged section on line VIII—VIII, Fig. I.

The structure I have shown to illustrate the invention comprises an asphalt receptacle 1 having inclined bottom walls 2 (Fig. I) which constitute the top walls of a heating chamber 3. The heating device shown in Fig. I comprises a series of gas burners 4 arranged within the heating chamber 3, but it is to be understood that the asphalt receptacle may be heated in any suitable manner. 5 designates a return chute leading from the asphalt receptacle for the purpose of returning asphalt thereto as will be hereinafter described. The chute 5 forms the top wall of a hot air flue 6, the latter being in communication with the heating chamber 3, as shown in Fig. I.

In the accompanying drawings, I have shown means for feeding reticulated lath units X from feed rolls located in the receptacle 1 to feed rolls which lie immediately above the return chute 5, said chute being located immediately below the path of the units X, so that some of the excess material will drop from the units directly to the chute, and some of the material will be removed from the units by adhering to the feed rolls. The feeding device in the receptacle 1 comprises a lower feed roll 7 located in the deep middle portion of said receptacle, and provided with journals 8, said journals being fitted to bearings 9 which lie wholly within the receptacle 1. These bearings are open at the top so that the feed roll 7 may be readily removed from the receptacle. The means for rotating the feed roll 7 comprises a gear wheel 10 secured to said feed roll (Figs. II, VI and VII), a drive gear 12 meshing with said gear wheel 10, and a drive shaft 13 secured to the drive gear 12. The drive shaft 13 extends through a side wall of the receptacle 1 and also through a stuffing box 14, as shown in Fig. VII. 15 designates a sprocket wheel, secured to the drive shaft 13 at a point outside of the receptacle 1. A sprocket chain 16, fitted to the sprocket wheel 15, may be driven through the medium of any suitable power mechanism. It will be noted that the means for driving the feed roll 7 is so constructed that it will not in any way interfere with the removal of said feed roll from the receptacle 1.

The feed roll B, located above the feed roll 7, is a sectional structure comprising a tubular roll section 17 provided with journals 18, and a series of annular roll sections 19 surrounding and loosely fitted to the tubular roll section 17. These annular roll sections 19 are free to yield independently of each other and independently of the tubular roll section 17 to which they are loosely fitted. The journals 18, extending from the tubular roll section 17, are fitted to bearing arms 20, the latter being pivotally supported by a drive shaft 21. The means for transmitting movement from the drive shaft 21 to the sectional feed roll B, comprises a sprocket wheel 22 fixed to the drive shaft 21, a sprocket wheel 23 fixed to one of the journals 18, and a sprocket chain 24 fitted to said sprocket wheels. It will be observed that the sectional feed roll may be readily lifted from the receptacle 1 to permit the removal of the lower feed roll 7.

A series of lower feed rolls 25, 26, 27 and 28 coöperate with a series of upper feed rolls C, D, E and F, respectively, to feed the laths X away from the receptacle 1. G designates an inclined guide for directing the laths X in an upward direction from the feed rolls in the receptacle 1 to the feed rolls C and 25. This inclined guide is a frame consisting of a pair of stepped bars 29 and a series of inclined guide bars 30 secured to said stepped bars. The inclined guide bars 30 are located in different planes and separated from each other, the lower edge of each of said guide bars being located in a plane below the path of the laths so as to permit the laths to pass freely in an upward direction, at the same time permitting excess material to flow downwardly from the upper faces of said guide bars. The feed rolls in the receptacle 1 push the laths onto the lower end of the inclined guide G, and the latter serves as a most efficient means for deflecting the laths from the body of asphalt to the feed rolls C and 25 which lie above the asphalt. The many openings in the laths X will fill with asphalt while the laths are passing through the receptacle 1, and a considerable quantity of asphalt will be pushed upwardly along the inclined guide G in front of the laths. Owing to the peculiar shape and arrangement of the elements of the guide G, a large quantity of this excess material will return to the receptacle 1 by flowing downwardly from the inclined guide bars 30, the latter being arranged to permit the excess material to flow downwardly while the laths are traveling upwardly toward the feed rolls C and 25.

Each of the lower feed rolls 25, 26, 27 and 28 is in the form of a tube or cylinder provided with hollow journals at its ends, said journals being mounted in suitable bearings at the side edges of the chute 5. These feed rolls are preferably heated through the medium of gas burners 31 located within the rolls, as shown in Figs. I and IV. Each gas burner 31 extends through one of the hollow journals of the roll with which it is associated.

Each of the upper feed rolls C, D, E and

F is a sectional structure comprising a tubular roll section 32 having hollow journals at its ends, said journals being rotatably mounted in suitable bearings. Each of these sectional rolls also includes a series of annular roll sections 33 surrounding and loosely fitted to the tubular members 32, the inside diameter of said annular sections being larger than the outside diameter of the tubular member to which they are fitted. These annular roll sections 33 are free to yield independently of each other and independently of the tubular member to which they are fitted, so as to compensate for variations in the dimensions of the laths X (see Fig. IV). The loose annular sections will force the laths into engagement with the lower feed rolls, and if several laths of different dimensions are traveling between the feed rolls at the same time, all of the laths will be firmly engaged with both the upper and lower feed rolls, as shown in Fig. IV. Since the annular roll sections 33 are free to yield independently of the tubular roll sections 32, the latter may be mounted in rigid, or non-yielding bearings, and it is, therefore, unnecessary to provide flexible joints on the gas pipes 34 which lead to the gas burners 35 in the sectional rolls.

Each of the rolls 25, 26, 27 and 28 is provided with a sprocket wheel 36 at one of its ends, as shown in Figs. IV and V, and a gear wheel 37 at its opposite end. Each of the sectional feed rolls C, D, E and F is provided with a gear wheel 38 which meshes with a gear wheel 37, as shown in Fig. IV. Each sprocket wheel 36 is driven through the medium of a sprocket chain 39. In this connection it is to be understood that the invention is not limited to any particular means for rotating the feed rolls, nor to any particular means for heating said rolls.

The excess material passing from the coated laths to the feed rolls 27 and 28 is scraped from said rolls and discharged onto the return chute 5. Each scraping device includes a pivot rod 40 and a row of independent scrapers 41 pivotally supported by said rod, each scraper having a recess for the reception of said pivot rod (Fig. III), a scraping edge 42 at one side of said recess, and a weighted portion 43 at the opposite side of the recess. The pivot receiving recess of each scraper is preferably open, as shown in Fig. III, so that the scrapers may be very easily applied to or removed from the pivot rod 40. The object in using a series of independent scrapers is to insure the desired contact at all points throughout the length of the feed roll to which the scraping device is fitted. A single scraper extending from one end of the feed roll to the other would be very materially distorted by the heat of the feed roll and its scraping edge would, therefore, fail to contact with the roll in the proper manner. The series of scrapers 41 arranged as shown in Figs. III and IV are free to contract and expand independently of each other and the action of the scraping device will not be impaired by the expansion and contraction of the feed roll and scrapers.

44 designates a trap (Fig. I) located at the lower end of the chute 5 and provided with an inlet opening 45 for the admission of the material flowing from the chute. This trap has a partition 46 forming an outlet passageway 47 from which the material overflows and passes into the main receptacle 1. It will be noted that this trap is so constructed that its liquid contents will flow to the main receptacle and at the same time form a seal for preventing the flow of air around the lower edge of the partition 46. A nozzle 48, is located above the trap 44 and above the path of the coated laths. A fan 49, or other suitable blast device, is associated with the nozzle 48 to provide for the discharge of air or other fluid from the nozzle. When the blast device is in operation, the air discharged from the nozzle 48 flows through the openings in the reticulated laths X, with the result of forcing excess material from said openings and into the liquid trap 44. The air and smoke passing from the hot laths at a point below the nozzle 48 are forced onto the surface of the liquid material in the trap 44, and then discharged therefrom through exhaust pipes 50 which communicate with the trap at points above the surface of the liquid. The liquid seal, formed by the liquid in the trap 44, prevents the air under pressure from escaping to the main receptacle 1, and the exhaust pipes 50 permit the air and smoke to escape freely from the hot asphalt, thereby insuring a desirable circulation of the air and smoke.

From the foregoing, it will be understood that the apparatus herein shown is adapted to feed units from the asphalt receptacle to a feeding device located above the asphalt, this feeding action being obtained without conducting a large quantity of asphalt from the receptacle. Excess material is removed from the coated articles by forcing air through said articles, and also by adhering to the feed rolls. The sectional feed rolls, provided with the loose annular roll sections, positively push all of the coated articles into engagement with the lower feed rolls, thereby insuring the desired firm contact for the feeding operation, and also insuring the removal of excess material by the feed rolls. This excess material finally drops onto the hot return chute whereby it is returned to the main receptacle.

I claim:

1. In an apparatus for coating units, a receptacle for the material to be applied to the units, a feeding device for feeding the units from said receptacle, and an inclined guide for directing the units in an upward direction while they are passing from said receptacle, said inclined guide including a series of bars separated from each other to permit the flow of excess material from said units to said receptacle, each of said bars being inclined so as to permit the units to pass freely in an upward direction, at the same time permitting excess material to flow downwardly from the upper faces of said bars.

2. In an apparatus for coating units, a receptacle for the material to be applied to the units, a pair of rotatable feed rolls for pushing the units from said receptacle, and an inclined guide frame for directing the units in an upward direction from said feed rolls, said inclined guide frame including a series of inclined bars located in different planes and separated from each other, the lower edge of each of said inclined bars being located in a plane below the path of the units so as to permit the units to pass freely in an upward direction, at the same time permitting excess material to flow downwardly from the upper faces of said bars.

3. In an apparatus of the character described, a sectional roll comprising a series of annular roll sections and a support to which said annular roll sections are loosely fitted; and means for feeding material to said annular roll sections, said annular roll sections being adapted to rotate while in engagement with said material, and said roll sections being free to yield independently of each other to compensate for irregularities in the dimensions of the said material.

4. In a coating apparatus, a receptacle for the coating material, means for feeding articles from said receptacle, and a sectional roll comprising a series of annular roll sections adapted to engage the articles after they have passed from said receptacle and a support to which said annular roll sections are loosely fitted, said annular roll sections being free to yield independently of each other and independently of said support to compensate for irregularities in the dimensions of said articles.

5. In an apparatus of the character described, a pair of rotatable feed rolls, one of which is a sectional structure including a support and a series of annular roll sections loosely fitted to said support and adapted to rotate while in engagement with the material passing between said rolls, said annular roll sections being adapted to yield independently of each other to compensate for irregularities in the dimensions of said material.

6. In an apparatus of the character described, an upper feed roll and a lower feed roll, said upper feed roll including a support and a series of annular roll sections surrounding and loosely fitted to said support and adapted to rotate while in engagement with the material passing between said rolls, said annular roll sections being adapted to force said material into engagement with the lower roll and also adapted to yield independently of each other to compensate for irregularities in the dimensions of said material.

7. In an apparatus of the character described, an upper feed roll and a lower feed roll, said upper feed roll including a rotatable support and a series of annular roll sections surrounding and loosely fitted to said rotatable support, and means for rotating said lower feed roll and said rotatable support, said annular roll sections being adapted to engage the material passing between the rolls so as to force said material into engagement with the lower roll, and said annular roll sections being free to yield independently of each other and independently of said rotatable support.

8. In an apparatus of the character described, a lower feed roll and an upper feed roll, said upper feed roll comprising a tubular roll section and a series of annular roll sections surrounding and loosely fitted to said tubular roll section, the inside diameter of said annular roll sections being larger than the outside diameter of said tubular roll section, said annular roll sections being free to yield independently of said tubular roll section so as to force the material to be fed into engagement with the lower roll, and means for heating said tubular roll section.

9. In an apparatus for coating reticulated articles, a receptacle for the material to be applied to said articles, means for feeding said articles away from said receptacle, a liquid-trap located below the path of said articles, and means for forcing fluid through the reticulated articles to remove excess material therefrom, said liquid-trap being located below the path of said articles at a point where it will receive said excess material.

10. In an apparatus for coating reticulated articles, a receptacle for the material to be applied to said articles, means for feeding said articles from said receptacle, a liquid-trap below the path of said articles, means for forcing air through the reticulated articles to remove excess material therefrom, the last mentioned means including a discharge member located above said trap and above the path of said reticulated articles, and said liquid-trap being provided with a discharge opening for the discharge of air from the surface of the excess material contained therein.

11. In an apparatus for coating reticulated articles, a receptacle for the material to be applied to said articles, means for feeding said articles from said receptacle, means for forcing air through the reticulated articles to remove excess material therefrom, the last mentioned means including a discharge member above the path of said articles, a liquid-trap located below said discharge member at a point where it will receive said excess material, said liquid-trap being so constructed and arranged that its liquid contents will overflow and return to said receptacle, at the same time forming a seal for preventing the flow of air from said liquid-trap to said receptacle, and an exhaust device for conducting air from said liquid-trap.

12. In an apparatus for coating reticulated articles, a receptacle for the material to be applied to said articles, means for feeding said articles from said receptacle, means for forcing air through the reticulated articles to remove excess material therefrom, the last mentioned means including a discharge member above the path of said articles, a liquid-trap located below said discharge member at a point where it will receive said excess material, said liquid-trap being so constructed and arranged that its liquid contents will overflow and return to said receptacle, at the same time forming a seal for preventing the flow of air from said liquid-trap to said receptacle, and an exhaust device for conducting air from said liquid-trap, said exhaust device including a pipe leading from said liquid-trap to permit the escape of air at a point above the surface of the material in said trap.

13. In an apparatus of the character described, a feeding device including a roll adapted to remove excess material from coated articles, means for heating said roll and a row of independent scrapers fitted to said roll, said scrapers being free to expand and contract independently of each other.

14. In an apparatus of the character described, a receptacle, a lower feed roll in said receptacle, an upper feed roll removably mounted above said lower feed roll, said lower feed roll being provided with journals, bearings located in said receptacle to receive said journals, said bearings being open at the top to permit the removal of said lower feed roll from said receptacle, a gear wheel arranged within said receptacle and secured to said lower feed roll, a drive wheel for transmitting power to said gear wheel, and a drive shaft passing through a wall of said receptacle and secured to said drive wheel.

GEO. PARKER CRUMBAUGH.